United States Patent
Wilson (10) Patent No.: US 12,540,104 B2
(45) Date of Patent: Feb. 3, 2026

(54) MARKING TRAFFICKED PAVEMENT SUBSTRATES USING A DRY POLYMER MODIFIED CEMENT

(71) Applicant: W. Robert Wilson, Boonton, NJ (US)

(72) Inventor: W. Robert Wilson, Boonton, NJ (US)

(*) Notice: Subject to any disclaimer, the term of this patent is extended or adjusted under 35 U.S.C. 154(b) by 1023 days.

(21) Appl. No.: 17/488,100

(22) Filed: Sep. 28, 2021

(65) Prior Publication Data

US 2022/0098123 A1 Mar. 31, 2022

Related U.S. Application Data

(60) Provisional application No. 63/084,353, filed on Sep. 28, 2020.

(51) Int. Cl.

| | |
|---|---|
| *C04B 41/50* | (2006.01) |
| *C04B 28/04* | (2006.01) |
| *C04B 41/00* | (2006.01) |
| *C04B 41/53* | (2006.01) |
| *C04B 41/63* | (2006.01) |

(Continued)

(52) U.S. Cl.
CPC .......... *C04B 41/5079* (2013.01); *C04B 28/04* (2013.01); *C04B 41/009* (2013.01); *C04B 41/53* (2013.01); *C04B 41/63* (2013.01); *C04B 41/65* (2013.01); *C04B 41/71* (2013.01); *C04B 41/72* (2013.01); *E01C 23/163* (2013.01); *E01C 23/22* (2013.01); *E01F 9/518* (2016.02); *E01F 9/524* (2016.02); *E01F 9/576* (2016.02);

(Continued)

(58) Field of Classification Search
CPC .......... E01F 9/518; E01F 9/524; E01F 9/576; C04B 41/5079
See application file for complete search history.

(56) References Cited

U.S. PATENT DOCUMENTS

| | | | | |
|---|---|---|---|---|
| 5,516,227 A | * | 5/1996 | Kozak | C09D 5/004 252/301.36 |
| 5,980,664 A | * | 11/1999 | Wilson, Sr. | E01C 23/246 523/172 |

(Continued)

OTHER PUBLICATIONS

Int'l Search Report and Written Opinion for Int'l Patent App No. PCT/US2021/071631, mailed Jan. 18, 2022, 9 pages, US International Search Authority.

*Primary Examiner* — Abigail A Risic
(74) *Attorney, Agent, or Firm* — Douglas J. Ryder; Ryder, Mazzeo & Konieczny LLC (57) ABSTRACT

Trafficked pavement substrates utilize markings to segregate traffic (e.g., divide lanes traveling in the same direction, divide sides of the road traveling in opposite directions). A dry polymer modified cement mixture may be used to provide the markings. The dry polymer modified cement mixture is prepared by mixing a dry polymer modified cement blend (ordinary Portland cement, aggregate and polymer powders) with water. The location of the lines is identified, and the dry polymer modified cement mixture is applied onto the identified areas as a thin layer. The dry polymer modified cement blend may include polymers to provide colored markings. Glass beads may be embedded into the dry polymer modified mixture before it cures to retroreflect light shined thereon. The trafficked pavement substrate may have troughs formed therein and the dry polymer modified cement markings may be formed therewithin so that the markings are flush.

16 Claims, 3 Drawing Sheets

(51) Int. Cl.
    *C04B 41/65*     (2006.01)
    *C04B 41/71*     (2006.01)
    *C04B 41/72*     (2006.01)
    *E01C 23/16*     (2006.01)
    *E01C 23/22*     (2006.01)
    *E01F 9/518*     (2016.01)
    *E01F 9/524*     (2016.01)
    *E01F 9/576*     (2016.01)
    *C04B 111/00*     (2006.01)

(52) U.S. Cl.
    CPC ............... *C04B 2111/00172* (2013.01); *C04B 2111/0075* (2013.01)

(56) References Cited

U.S. PATENT DOCUMENTS

| | | | |
|---|---|---|---|
| 6,514,595 B1 | 2/2003 | Sprouts | |
| 7,714,058 B2 | 5/2010 | Wilson | |
| 8,784,557 B2 | 7/2014 | Reck | |
| 10,221,527 B2 | 3/2019 | Wilson | |
| 10,654,751 B2 | 5/2020 | Wilson | |
| 11,242,660 B1* | 2/2022 | Makosch | E01F 9/529 |
| 2003/0194502 A1 | 10/2003 | Sadlier | |
| 2009/0010713 A1 | 1/2009 | Kotting | |
| 2018/0037500 A1* | 2/2018 | Wilson | C04B 16/0625 |
| 2021/0180274 A1* | 6/2021 | Clear | B32B 7/12 |
| 2021/0238866 A1* | 8/2021 | Paisley | E04F 15/12 |
| 2022/0098804 A1* | 3/2022 | Wilkens | E01C 23/0993 |
| 2024/0301637 A1* | 9/2024 | Lee | E01F 9/518 |

\* cited by examiner

MARKING TRAFFICKED PAVEMENT SUBSTRATES USING A DRY POLYMER MODIFIED CEMENT

BACKGROUND

Pavement surfaces, such as asphalt and concrete, are used to carry traffic, including vehicles (e.g., automobiles, bikes, construction equipment) and humans. Pavement surfaces may need to be marked for various reasons including safety (e.g., divide lanes, segregate oncoming traffic, identify routes, provide directions) and aesthetics. Pavement surfaces may be marked with either mechanical or non-mechanical means.

Mechanical means may include, for example, devices mounted on or embedded in the pavement surface as well as modifications to the pavement surface. The devices mounted on, or embedded in, the pavement surface may include, raised pavement markers and road studs. The raised pavement markers may be made with plastic, ceramic, thermoplastic paint, glass or occasionally metal, come in a variety of shapes and colors, and may include a lens or sheeting that enhances their visibility by retroreflecting automotive headlights. The road studs may be made of glass and may gather automotive headlights with a dome shape and reflect the lights with a reflective layer within. The raised pavement markers and/or road studs may simply be referred to as "reflectors" or may have specific names such as Botts' dots and cat's eyes. Other mechanical means may include, for example troughs formed in the surface (e.g., rumble strips).

The various mechanical means may be expensive and labor intensive. Furthermore, as they require work to be performed on the pavement surfaces, the pavement surfaces may be damaged or degraded by application thereto. Additionally, the modifications necessary to add the mechanical means to the pavement surfaces may result in visible marks in the pavement surfaces that may cause confusion to drivers. Moreover, the devices may be damaged by, for example, traffic being driven thereover, the elements and/or snowplows cleaning snow and/or ice from the pavement surface.

Non-mechanical means may include coatings applied to the pavement substrate including, for example, paints, thermoplastics, polymer coatings (e.g., epoxy), and tape (e.g., thermoplastic, polymer). The various coatings may have limited lifecycles in that, for example, they may be worn off, peel off, or lose their color over time. The coatings may, for example, be susceptible to ultra-violet light, condensation (e.g., snow, rain), or the wear and tear of traffic passing thereover. In some situations, the coatings may be damaged by snowplows passing thereover. Furthermore, the various coatings may be thermally incompatible, meaning that their dimensional properties change at different rates, than the pavement substrate they are applied to. The thermal incompatibility may result in delamination of the coating from the pavement surface or damage to the pavement surface. In addition, the properties of the various coatings may change with age (e.g., steric hardening, loss of volatiles) resulting in degradation thereof.

The various coatings may include glass beads embedded therewithin (e.g., paints, thermoplastics, polymer coatings) or mounted thereto (e.g., tape) to enhance their visibility by retroreflecting automotive headlights. The glass beads may have limited life span as they may become damaged or dislodged from, for example, condensation (e.g., snow, rain), the wear and tear of traffic passing thereover, or snowplows passing thereover.

What is needed is a non-mechanical means having a longer life expectancy than typical non-mechanical means (e.g., stay secured to pavement substrate, maintain color, secure glass beads).

BRIEF DESCRIPTION OF DRAWINGS

The features and advantages of the various embodiments will become apparent from the following detailed description in which.

DETAILED DESCRIPTION

Polymer modified cements are cement blends (e.g., concrete, mortar) that include the addition of the polymers to, for example, increase flexibility, increase workability, increase bond with underlying substrate and/or form a tough and long-wearing surface. Preferred polymer modified cements used as thin overlays have excellent initial and long-term bond to the pavement substrates. Preferred polymer modified cements do not soften at elevated temperatures or embrittle at lower temperatures. Preferred polymer modified cements provide an overlay that is resistant to traffic and weathering and has a long-life expectancy. Preferred polymer modified cements may also act as an adhesive layer (similar to epoxy, polyurethane, and bitumen) where prior to curing objects may be received thereby and then once cured the objects are secured therein. The polymer modified cements may include pigments for coloring.

Preferred polymer modified cements may be designed to be applied to trafficked pavement substrates (concrete, asphalt) as thin overlays. The trafficked pavement substrates may include, but is not limited to, roads, highways, bridges, runways, on/off ramps, and parking lots. The trafficked pavement substrates enable a plurality of vehicles (e.g., automobiles, aircraft) to traverse thereover on a consistent basis. The various trafficked pavement substrates may require markings to identify, for example, lanes, traffic flow, and directions. The preferred polymer modified cements may be used to mark the trafficked pavement substrates much like is currently done with paints, thermoplastics, polymer coatings (e.g., epoxy), and tape (e.g., thermoplastic, polymer).

Figure 1:
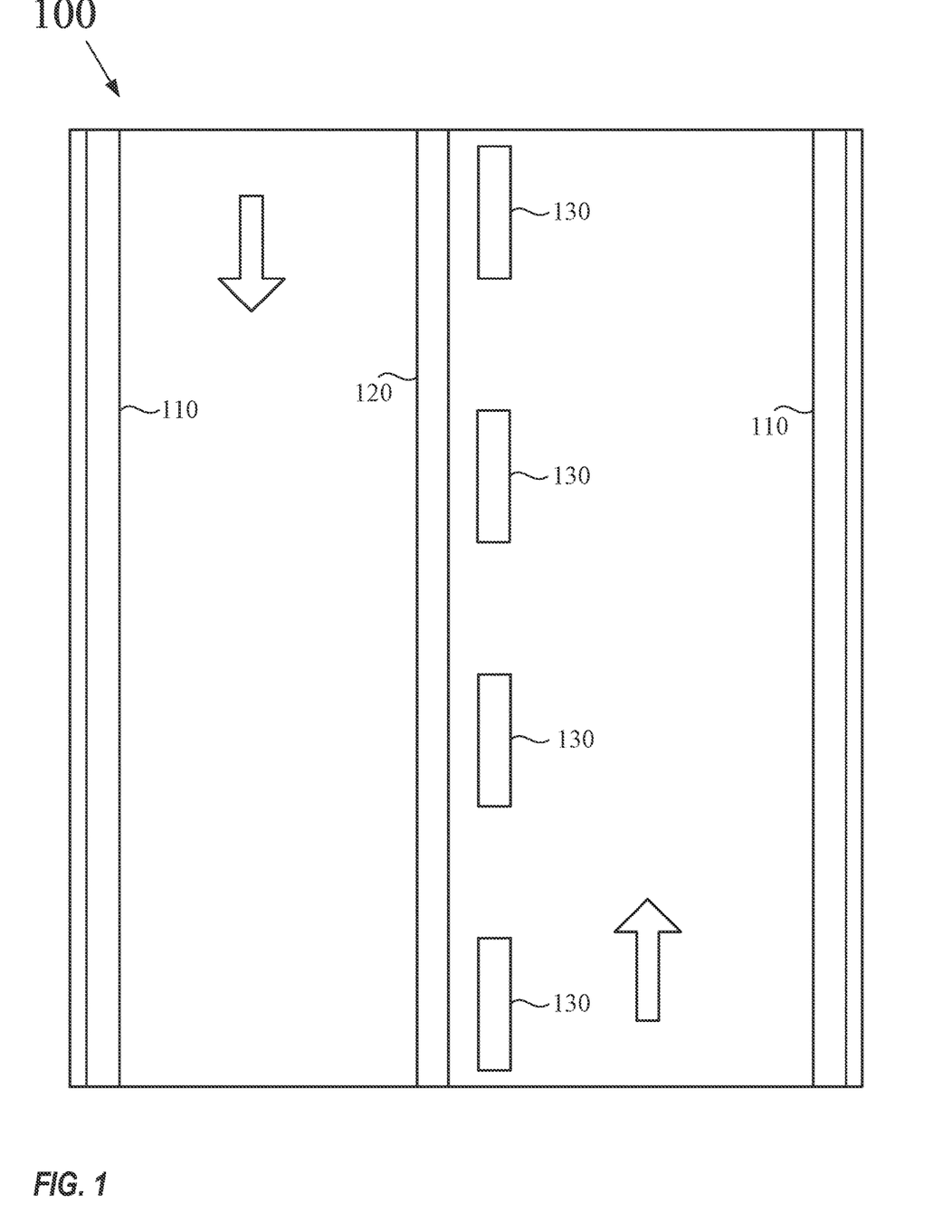
FIG. 1 illustrates an example trafficked pavement substrate (e.g., road having one lane in each direction) with markings.

FIG. 1 illustrates an example trafficked pavement substrate (e.g., road having one lane in each direction) 100 with markings. The markings on the road 100 include white lines 110 extending along each edge of the road 100. A white line 110 typically identifies in the United States (US) boundaries for a lane in a certain direction. The markings also include a solid yellow line 120 on the left side of the center of the road 100 and a dashed yellow line 130 on a right side of the center of the road 100. The yellow lines 120, 130 typically indicate in the US that the traffic on the other side of the lines travels in an opposite direction. As illustrated, traffic on left of yellow lines 120, 130 is travelling downward and traffic on right of yellow lines is traveling upward.

A solid yellow line 120 typically indicates in the US that you cannot cross over the line to pass. Accordingly, as illustrated traffic in the left lane (traveling downward) could not cross into the right lane to pass. A dashed yellow line 130 typically indicates in the US that you can cross over the line to pass. Accordingly, as illustrated traffic in the right lane (traveling upward) could cross into the left lane to pass.

The various lines 110, 120, 130 could be a thin strip of polymer modified cement applied to the trafficked pavement substrate 100. The lines 110 could be provided by continuously applying (e.g., spraying) a white colored polymer modified cement to the edges of the trafficked pavement substrate 100. Likewise, the line 120 could be provided by continuously applying (e.g., spraying) a yellow colored polymer modified cement to the center of the trafficked pavement substrate 100. The line 130 could be provided by intermittently applying (e.g., spraying) according to a desired pattern a yellow colored polymer modified cement to the center of the trafficked pavement substrate 100.

According to one embodiment, some or all of the polymer modified cement markings 110, 120, 130 may include, for example, glass beads secured therein to enhance the visibility of the markings by retroreflecting automotive headlights. The glass beads may be provided (e.g., dropped, broadcast) to the polymer modified cement markings prior to the polymer modified cement curing. Once cured, the beads will be secured with the polymer modified cement markings. Alternatively, the glass beads may be mixed with the polymer modified cement prior to the polymer modified cement being applied as the markings.

It should be noted that road markings are not limited to the solid white lines on the edges of a road and solid and dashed yellow lines in the center of the road as illustrated. Rather, various different line configurations could be utilized without departing the current scope. For example, to separate the different directional lanes a single yellow line could be utilized, double solid yellow lines in the center could be utilized to indicate no passing in either direction, or dashed yellow lines could be utilized to indicate wither direction could pass. Furthermore, if multiple lanes are utilized in each direction, the different lanes could be separated with white markings (e.g., dashed if passing allowed, solid if no passing).

Additionally, the markings are not limited to lines separating lanes (markings that flow in same direction as the trafficked pavement substrate). Rather the markings could include, but is not limited to, arrows indicating direction, lines indicating location for stopping for red lights and stop signs, lines identifying waiting areas, identifications of the trafficked pavement substrate (e.g., interstate number, road name, runway number), bike lanes, shoulders, and/or pedestrian pathways without departing from the current scope. The application of more complicated markings (e.g., arrows, numbers, names) or markings not flowing with the trafficked pavement substrate (e.g., lines going across the trafficked pavement substrate) may require, for example, stencils to prepare the markings.

Cement blends typically include cement (e.g., ordinary Portland cement), aggregate and possibly other materials (e.g., microfibers, plasticizer, filler, accelerator, retarder). The polymers used in the polymer modified cements may be, for example, dry polymers (e.g., polymer powders). The dry polymers may be mixed with the cement blend to create a dry polymer modified cement blend. The dry polymer modified cement blend is mixed with water and then the dry polymer modified cement mixture is applied to the desired location. The use of a dry polymer improves the quality control during the mixing of the product on site as the dry polymer modified cement blend may be delivered to the site and simply require the addition of water which simplifies the mixing and placing operation on site. The dry polymer modified cements will not typically have some of the issues associated with wet polymer modified cements (e.g., air voids, surface tension cracks).

The dry polymers may be redispersible binders. According to one embodiment, the redispersible binders may be based on a copolymer of vinyl acetate and ethylene. The redispersible polymer may also include defoaming and self-leveling properties to assist with the reduction of air during the mixing process that is common when wet polymers are mixed with cement blends. The reduction of air improves the impermeability of the surface mix and increases the abrasion resistance of the cured material.

The aggregate typically used in cement blends, as well as dry polymer modified cement blends, is sand or other aggregate having gradations that meet the ASTM C144 specification. The aggregate is used to provide layer thickness, to improve mixing, limit segregation and may provide a rough surface that can increase skid resistance. Using aggregate gradations that meet the ASTM C144 specification provides a gradation that is intended to consume a moderate quantity of cement, produces a wet mix that is workable without having to use too much water or additives, does not shrink excessively, and cures at an appropriate rate to allow a bond to develop with the underlying substrate. Using aggregate gradations that meet the ASTM C144 specification produces, after mixing the blend with water, a dry polymer modified cement mixture that may be applied to an underlying substrate as a relatively thin layer (e.g., thicknesses of up to approximately ⅛ in (3 mm)).

It was believed that aggregate having a finer gradation than ASTM C144 specification would consume too much cement. However, using aggregate with finer gradations than the ASTM C144 specification (ultrafine aggregate) actually provides a dry polymer modified cement mixture that can be applied even thinner (and thus not consume additional cement) and also enables objects (e.g., glass beads) to be received thereby easier and be secured therein better. The ultrafine aggregate may be any semi gap graded material with a $D_{80}$ of less than 300 microns and a $D_{40}$ of less than 200 microns. According to one embodiment, the ultrafine aggregate may be marble dust. A dry polymer modified cement mixture using ultrafine aggregate may be applied to an underlying substrate at thicknesses between $1/75^{th}$ inch (0.3 mm) to $1/16^{th}$ inch (1.5 mm).

According to one embodiment, the dry polymer modified cement mixture may also include microfibers to limit segregation, shrinkage and exothermal generation. The microfibers may be natural or synthetic. The microfibers may have a length of up to approximately 1 inch.

According to one embodiment, the dry polymer modified cement mixture may also include additives. The additives may include, for example, a plasticizer to increase workability. The additives may include a filler, such as a pozzolanic filler, to increase workability, limit segregation and shrinkage and increase long term compressive strength. The filler may be fly ash, such as class C or class F fly ash. The additives may include, for example, an accelerator to increase curing process that may be needed for nighttime applications and time sensitive applications. The additives may include, for example, a retarder along with the accelerator to delay the change in workability that comes from adding the accelerator.

According to one embodiment, the dry polymer modified cement mixture may be similar to the dry polymer cement overlay described in U.S. Pat. No. 8,784,557 which is herein incorporated by reference. According to one embodiment, the dry polymer cement may use different versions for at least some of the various ingredients described therein (e.g., may use different dry polymers than the Elotex® polymers noted therein, aggregate may be ultrafine aggregate), may use different ratios for at least some of the ingredients, may replace certain ingredients, may add ingredients thereto, may delete ingredients therefrom, may use a single ingredient in place of a combination of different ingredients and/or may use a combination of different ingredients instead of a single ingredient. The ingredients and the ratios may depend on the specific application of the dry polymer cement overlay.

According to one embodiment, the dry polymer modified cement may be the Endurablend® product provided by Pavement Surface Coatings, LLC, a New Jersey Corporation.

The base color of the cement is a light color (e.g., white) and the base color of the aggregate (e.g., marble dust) may also be a light color (e.g., white). Accordingly, the starting color of the dry polymer modified cement mixture is a light color. Furthermore, the base colors of the cement and aggregate do not fade so the light color should not fade or wear over time. As such, base dry polymer modified cement (e.g., without any pigment added thereto) used for markings may provide a light color that is maintained better than paints, thermoplastics, polymer coatings (e.g., epoxy), and/or tape (e.g., thermoplastic, polymer) that is currently used.

The dry polymer modified cement may include a white pigment to make the dry polymer modified cement visibly whiter and brighter. Using a white pigmented dry polymer modified cement for markings may provide white road markings that are more visible, especially at night or in bad weather. As noted above, white road markings may typically be utilized to mark boundaries for lanes of traffic traversing the same direction. White pigmented dry polymer modified cement may be used for other markings as well including arrows for directions, identifications for the trafficked pavement substrate (e.g., road, runway), and lines to indicate stopping locations.

The dry polymer modified cement mixture may include different colored pigments to provide a different colored dry polymer modified cement. The dry polymer modified cement may be colored to an appropriate color for the desired markings. For example, a yellow pigment may be utilized to provide a yellow dry polymer modified cement that can be utilized to provide yellow markings to differentiate opposite directions of travel on a road. Other colors may be utilized to provide the desired color for the markings required or desired. By way of another example, a green polymer may be used to provide a green polymer modified cement that can be utilized to mark a bike path.

As the colored dry polymer modified cement is applied as a thin overlay, enough pigment can be utilized so that the color is applied throughout. As such, the color retention of the dry polymer modified cement is excellent. Accordingly, it is possible to use pigments that are more costly due to the brightness of the colors and/or the ability of the pigments to limit the absorption of the sun's radiation (visible light and/or infrared light) so that the trafficked pavement substrate reflects some of the sun's radiation and the temperature does not remains cooler.

While the dry polymer modified cement may provide road markings that are brighter than paints, thermoplastics, polymer coatings (e.g., epoxy), and tape (e.g., thermoplastic, polymer) commonly used for markings, and the color may be maintained for a longer period of time, there still will be occasions where the lines are difficult to see, for example, at night or in bad weather (e.g., rain, snow). As such, road markings may include glass beads secured therein to enhance the visibility of the markings by retroreflecting automotive headlights. The glass beads may be provided (e.g., dropped, broadcast) to the polymer modified cement markings prior to the polymer modified cement curing. Once cured, the beads will be secured with the polymer modified cement markings.

While the dry polymer modified cement markings may be very thin (e.g., between $1/75^{th}$ inch (0.3 mm) to $1/16^{th}$ inch (1.5 mm)), they still may extend from a surface of the trafficked pavement substrate. If glass beads are located within the dry polymer modified cement markings, they may extend up slightly from the markings. Accordingly, the dry polymer modified cement markings may be subject to damage and the glass beads may be susceptible to damage and/or dislodgement. This may be especially true in locations where snow fall, and the use of snowplows is common. In these situations, it may be desirable to have the dry polymer modified cement markings and the glass beads flush with the trafficked pavement substrate so that the snowplows provide less stress thereto and cause less damage.

According to one embodiment, the trafficked pavement substrate may have a trough formed therein where the dry polymer modified cement markings are to be provided. The trough should have a depth that approximates the thickness of the dry polymer modified cement markings (e.g., between $1/75^{th}$ inch (0.3 mm) to $1/16^{th}$ inch (1.5 mm)) and a width that approximates a desired width of the appropriate markings. One skilled in the art would recognize that there are multiple ways of creating the trough. For example, the trough may be formed by removing a top layer of the trafficked pavement substrate to the desired width and depth via milling. Alternatively, the trough may be formed when the trafficked pavement substrate is laid or when a surface coating is added thereto.

The depth of the trough may be as little as the thickness of the polymer modified cement markings that are to be applied to the trafficked pavement substrate so that the markings are flush with the trafficked pavement substrate. Alternatively, the depth of the trough may be deeper that than the thickness of the dry polymer modified cement if the markings are desired to be recessed. If the depth of the trough is deeper than the typical thickness of the dry polymer modified cement markings and the markings are desired to be flush with the trafficked pavement substrate, the dry polymer modified cement markings may be applied thicker than normal (thickness equal to the depth of the trough). Thicker dry polymer modified cement markings may enable larger items to be embedded within the markings. The thicker dry polymer modified cement markings may also require longer to cure.

Figure 2:
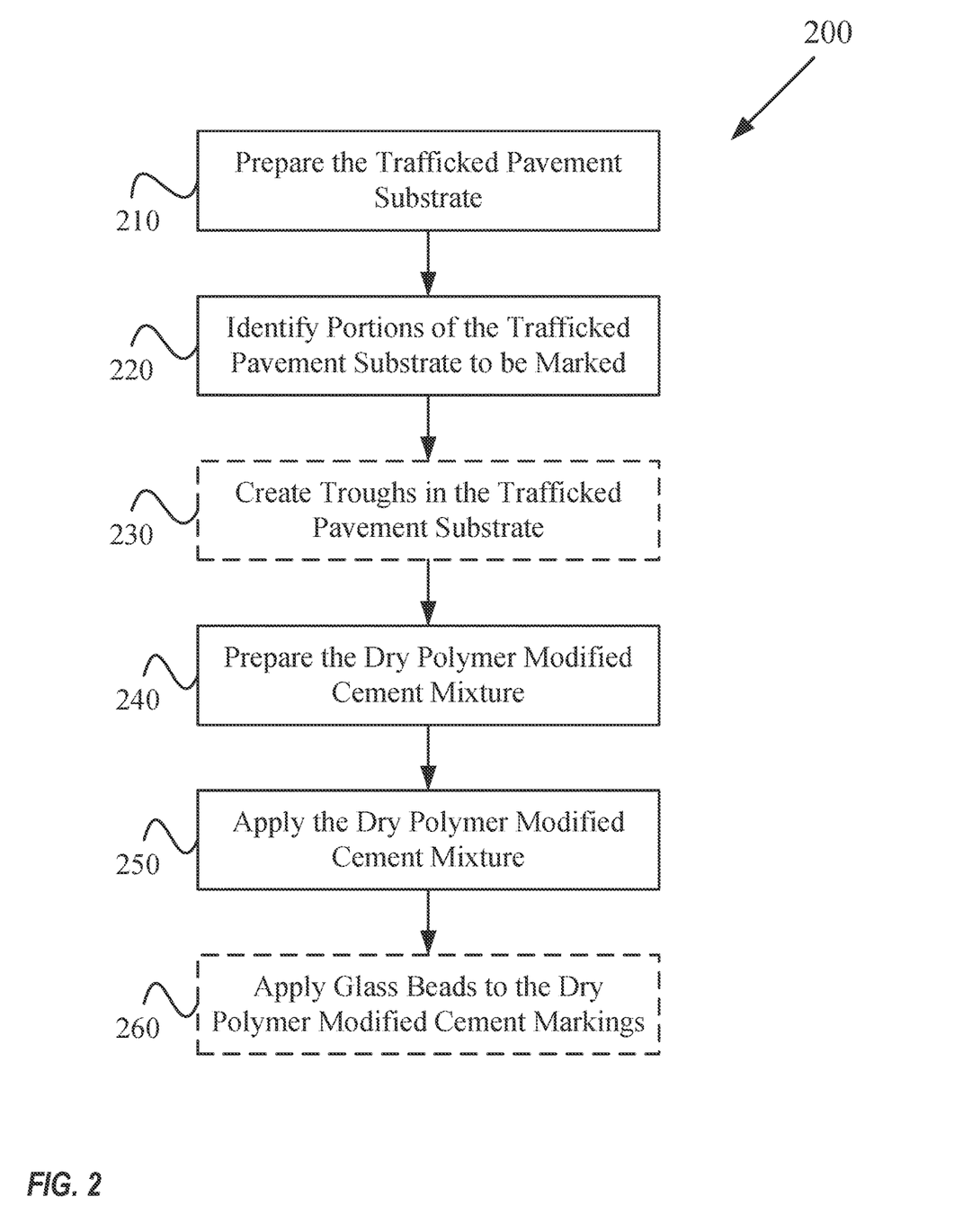
FIG. 2 illustrates an example process flow for using a dry polymer modified cement for marking a trafficked pavement substrate, according to one embodiment.

FIG. 2 illustrates an example process flow 200 for using a dry polymer modified cement for marking a trafficked pavement substrate. The flow 200 is focused on markings such as those illustrated in FIG. 1 that follow the direction of the trafficked pavement substrate (e.g., lane dividers, road borders). Initially the underlying trafficked pavement substrate must be prepared 210. The trafficked pavement substrate should be clean and dry to ensure proper adhesion of the dry polymer modified cement. Any loose dust or dirt should be removed. Typically, the loose dust or dirt can be removed with blowers (e.g., industrial blowers). However, if the trafficked pavement substrate is soil contaminated, then the substrate may require pressure washing. Any wet spots, oil spots, dirt, curing compounds and any films should be removed as part of the substrate preparation. If the trafficked pavement substrate includes pavement marking materials (e.g., paints, thermoplastics, polymer coatings, tape), these pavement marking materials should be removed using an appropriate technique (e.g., shot blasting, high pressure water blasting, grinding).

The markings required and/or desired for the trafficked pavement substrate are then identified 220. The markings may include, but are not limited to, yellow lines dividing opposite directions on a road, white lines dividing lanes in the same direction, dashed lines indicating passing is allowed, and solid lines indicating no passing. The identification of the lines may include identifying the location (e.g., center of trafficked pavement substrate, edges of trafficked pavement substrate, lane dividers), style (e.g., solid, dashed) and color (e.g., yellow, white). Furthermore, the identification of the lines may also include identifying whether glass beads are to be included in any portions thereof. Moreover, the identification of the lines may also include whether any of the lines should be flush with, or recessed from, the trafficked pavement substrate (e.g., for locations where the use of snowplows could damage the markings and/or damage/dislodge glass beads contained therein).

The trafficked pavement substrate may be modified to create troughs therein for markings that are to be flush with the trafficked pavement substrate 230. The trough may be formed by removing a top layer of the trafficked pavement substrate to the desired width and depth via milling. It should be noted that the creation of a trough may not be required/desired for every application and is therefore an optional step that is illustrated as dashed box.

The dry polymer modified cement mixture is then prepared 240. The dry polymer modified cement blend may be delivered to the site with all the necessary elements mixed together at the appropriate proportions for the job at hand. The dry polymer modified cement mixture may be prepared by mixing an appropriate amount of dry polymer modified cement blend with an appropriate amount of water. According to one embodiment, the dry polymer modified cement blend may be mixed with cold water or ice may be added with the water to increase the workability of the mixture.

The dry polymer modified cement mixture may be applied to the trafficked pavement substrate at appropriate locations to provide the desired markings 250. The dry polymer modified cement mixture is applied wet to the trafficked pavement surface so that it ensures an excellent initial and long-term bond. The dry polymer modified cement mixture is applied as a thin overlay. The dry polymer modified cement mixture may be applied using standard processes, such as screeding or spraying. Preferably, the polymer modified cement is sprayed on using a spray truck that applies the dry polymer modified cement onto the trafficked pavement substrate to create the desired marking lines (appropriate color, location and style).

The dry polymer modified cement mixture may be prepared and provided to a vehicle capable of marking the trafficked pavement substrate (stripping vehicle). Alternatively, the stripping vehicle may be capable of housing and mixing the polymer modified cement blend and the water to create the polymer modified cement mixture. The stripping vehicle may include one or more nozzles that can be activated to spray the dry polymer modified cement mixture at appropriate times. For example, to make solid lines, one or more spray nozzles may be activated for long stretches of time. Alternatively, to make dashed lines the one or more spray nozzles may be activated intermittently to make the desired lines. The one or more nozzles may be automatically and/or manually operated to provide the appropriate markings.

If the pavement markings are to include glass beads, the glass beads may be provided (e.g., dropped, broadcast) onto the dry polymer modified cement mixture before the mixture cures 260. According to one embodiment, the stripping vehicle may include storage units for housing the glass beads and a means for dropping and/or broadcasting the glass beads behind the nozzles that are spraying the dry polymer modified cement markings. The means for dropping the glass beads may be automatically and/or manually operated to provide the glass beads on the appropriate markings.

According to one embodiment, affiliated complimentary vehicles, may be utilized to spray the dry polymer modified cement mixture onto the pavement surface and to drop (broadcast) the glass beads onto the uncured dry polymer modified cement mixture. It should be noted that the application of the glass beads to the marking lines may not be required/desired for every application and is therefore an optional step that is illustrated as dashed box.

It should be noted that the example flow chart 200 is not intended to limit the process of providing dry polymer modified markings on trafficked pavement substrates to the steps and/or the order of the steps illustrated. Rather, steps may be added, deleted, combined, separated and/or the order of the steps may be modified without departing from the scope of the current invention. The invention is intended to cover the various manners in which dry polymer modified cement may be applied to a trafficked pavement substrate to provide markings thereon.

Figure 3:
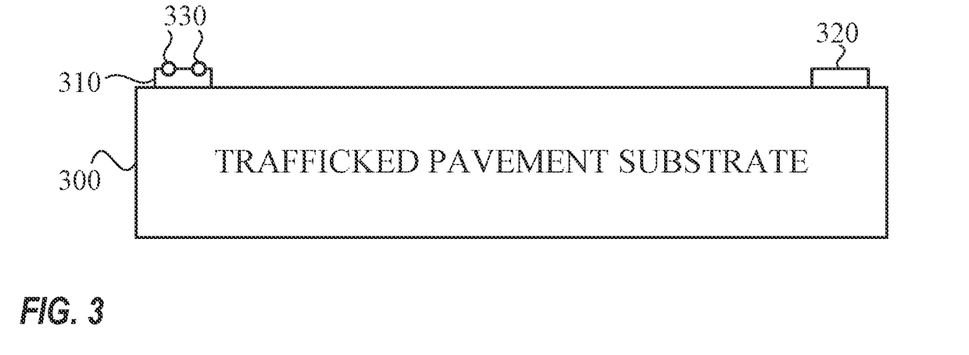
FIG. 3 illustrate an example cross section of a dry polymer modified cement marked trafficked pavement substrate, according to one embodiment.

FIG. 3 illustrate an example cross section of a dry polymer modified cement marked trafficked pavement substrate. A trafficked pavement substrate 300 has dry polymer modified cement applied as marking lines 310, 320 on each side thereof. As the dry polymer modified cement is applied as a thin layer (e.g., between $1/75^{th}$ inch (0.3 mm) to $1/16^{th}$ inch (1.5 mm)), the marking lines 310, 320 protrude by that amount above the substrate 300. As illustrated, the marking line 310 includes glass beads 330 embedded therein. The glass beads 330 may slightly protrude out of the marking 310.

Figure 4A:
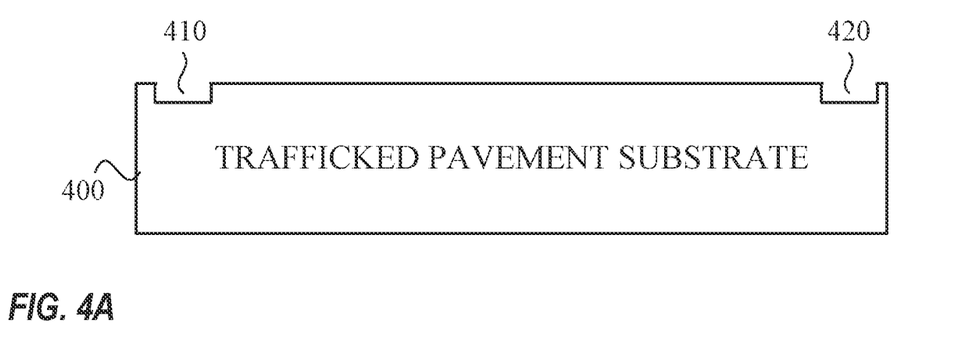
FIGS. 4A-B illustrate example cross sections of a process to create an inlaid dry polymer modified cement marked trafficked pavement substrate, according to one embodiment.
Figure 4B:
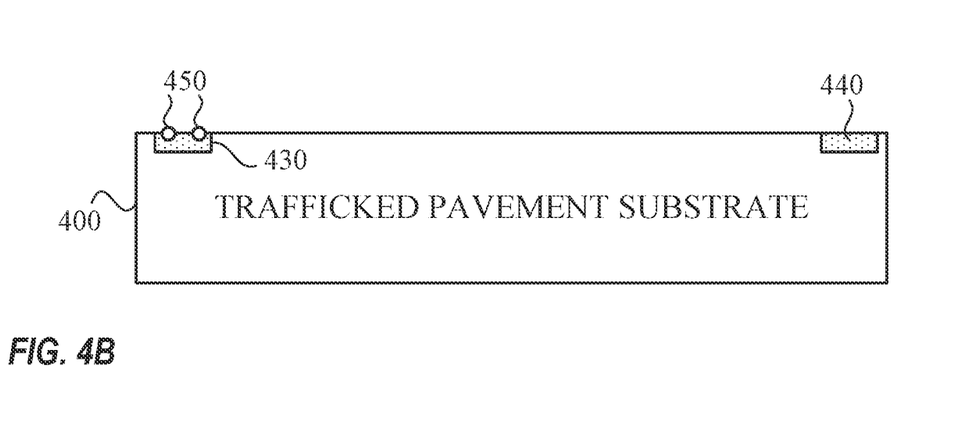

FIGS. 4A-B illustrate example cross sections of a process to create an inlaid dry polymer modified cement marked trafficked pavement substrate. FIG. 4A illustrates a trafficked pavement substrate 400 having troughs 410, 420 formed in each side thereof. The troughs 410, 420 are to receive the dry polymer modified cement applied markings where the markings do not extend above a surface of the substrate 400. The troughs may have a depth approximately equal to the thickness of the dry polymer modified cement markings (e.g., between $1/75^{th}$ inch (0.3 mm) to $1/16^{th}$ inch (1.5 mm)).

FIG. 4B illustrates the dry polymer modified cement applied as marking lines 430, 440 within each of the troughs 410, 420. As the dry polymer modified cement is applied as a thin layer having a thickness that approximates the depth of the troughs 410, 420, the marking lines 430, 440 are substantially flush with the substrate 400. As illustrated, the marking line 430 includes glass beads 450 embedded therein. The glass beads 450 may slightly protrude out of the marking 430.

As previously noted, the use of dry polymer modified cement is not limited to providing marking lines. Rather, the dry polymer modified cement can be utilized for various markings without departing from the current scope. Markings other than lines may require the use of stencils to get the appropriate markings (e.g., arrows, words, numbers).

The dry polymer modified cement markings may be applied over both asphaltic and concrete surfaces, including sealcoats; single chip, double chip or cape seals; all asphalt slurry types; all asphalt microsurfacings, thin hot mix flexible asphalt pavement surfaces with high surface deflections (≥0.8 mm deflection); thick hot mix flexible asphalt pavement surfaces with low surface deflections (≤0.8 mm deflection); all Portland cement concrete pavements; roller compacted concrete; and whitetopping. The dry polymer modified cement markings may be applied on smooth, textured and porous surfaces.

The dry polymer modified cement markings may be fully recycled as a recyclable asphalt product when future milling operations occur.

The dry polymer modified cement markings have been described as possibly including glass beads embedded therein. The dry polymer modified cement markings are not limited to glass beads being embedded therein. Rather, other items could be embedded therein as desired without departing from the current scope. For example, technology that could be used by self-driving cars to, for example, determine the location of the lanes could be embedded in the dry polymer modified cement markings.

Although the invention has been illustrated by reference to specific embodiments, it will be apparent that the invention is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. A method for marking a trafficked pavement substrate using a dry polymer modified cement, the method comprising:
    identifying portions of the trafficked pavement substrate to be marked;
    preparing a dry polymer modified cement mixture by mixing a dry polymer modified cement blend with water, wherein the dry polymer modified cement blend includes ordinary Portland cement, ultrafine aggregate as small as approximately 300 microns and polymer powders; and
    applying the dry polymer modified cement mixture as a thin layer onto the identified portions of the trafficked pavement substrate, wherein the thin layer can have a thickness as small as approximately $1/75^{th}$ inch (300 microns).

2. The method of claim 1, wherein the polymer powders are redispersible binders.

3. The method of claim 2, wherein the redispersible binders are based on a copolymer of vinyl acetate and ethylene.

4. The method of claim 1, wherein the ultrafine aggregate is a semi gap graded material with a Dao of less than 300 microns and a $D_{40}$ of less than 200 microns.

5. The method of claim 1, wherein the dry polymer modified cement blend further includes microfibers to limit segregation, shrinkage and exothermal generation and improve workability.

6. The method of claim 1, wherein the dry polymer modified cement blend further includes pigments to provide an appropriate color for markings.

7. The method of claim 1, wherein the applying a dry polymer modified cement mixture as a thin layer includes applying the dry polymer modified cement mixture as a thin layer having a thickness between $1/75^{th}$ inch (0.3 mm) to $1/16^{th}$ inch (1.5 mm).

8. The method of claim 1, wherein the applying a dry polymer modified cement mixture includes spraying the dry polymer modified cement mixture onto the identified portions of the trafficked pavement substrate.

9. The method of claim 1, further comprising providing glass beads onto the applied dry polymer modified cement mixture, wherein the glass beads are to retroreflect light shined thereon.

10. The method of claim 1, further comprising milling at least a subset of the identified portions of the trafficked pavement substrate to be marked to create troughs in the trafficked pavement substrate, wherein the applying a dry polymer modified cement mixture includes applying the dry polymer modified cement mixture within the troughs in the trafficked pavement substrate to create marking not extending above the trafficked pavement substrate.

11. A method for marking a trafficked pavement substrate using a dry polymer modified cement, the method comprising:
    identifying markings on the trafficked pavement substrate, wherein the identifying includes location, style and color of the markings and if glass beads are to be embedded in any portions of the markings;
    preparing a dry polymer modified cement mixture by mixing a dry polymer modified cement blend with water, wherein the dry polymer modified cement blend includes ordinary Portland cement, ultrafine aggregate as small as approximately 300 microns, polymer powders and pigments, and wherein the pigments are selected based on the identified color of the markings;
    spraying the dry polymer modified cement mixture onto the trafficked pavement substrate as a thin layer that can have a thickness as small as approximately $1/75^{th}$ inch (0.3 mm), wherein the dry polymer modified cement mixture is sprayed onto the trafficked pavement substate according to the location and the pattern identified; and
    providing the glass beads onto the identified portions of the sprayed dry polymer modified cement mixture prior to the dry polymer modified cement mixture curing to retroreflect light shined thereon.

12. The method of claim 11, wherein the polymer powders are redispersible binders based on a copolymer of vinyl acetate and ethylene.

13. The method of claim 11, wherein the ultrafine aggregate is a semi gap graded material with a Dao of less than 300 microns and a $D_{40}$ of less than 200 microns.

14. The method of claim 11, wherein the spraying the dry polymer modified cement mixture includes spraying the dry polymer modified cement mixture at thicknesses between $1/75^{th}$ inch (0.3 mm) to $1/16^{th}$ inch (1.5 mm).

15. The method of claim 11, wherein the providing glass beads onto the sprayed dry polymer modified cement mixture includes dropping the glass beads onto the sprayed dry polymer modified cement mixture before the dry polymer modified cement mixture cures.

16. The method of claim 11, further comprising
identifying an inlaid marking to be flush with, or recessed from, the trafficked pavement substrate;
milling the trafficked pavement substrate in alignment with the inlaid marking to create a trough in the trafficked pavement substrate; and
spraying the dry polymer modified cement mixture within the trough in the trafficked pavement substrate to create the inlaid marking.

\* \* \* \* \*